(12) United States Patent
Bazylenko

(10) Patent No.: US 6,807,349 B2
(45) Date of Patent: Oct. 19, 2004

(54) PLANER WAVEGUIDE AND METHOD OF FORMATION

(76) Inventor: Michael Bazylenko, C-/ Suite 301, Level 3, 1 Central Avenue, Australian Technology Park, Eveleigh, New South Wales (AU), 1430

( * ) Notice: Subject to any disclaimer, the term of this patent is extended or adjusted under 35 U.S.C. 154(b) by 333 days.

(21) Appl. No.: 09/946,712

(22) Filed: Sep. 4, 2001

(65) Prior Publication Data
US 2003/0044153 A1 Mar. 6, 2003

(51) Int. Cl.$^7$ .................................................. G02B 6/02
(52) U.S. Cl. ........................................................ 385/127
(58) Field of Search ................................. 385/125–130, 385/147, 14–16; 427/525–527

(56) References Cited

U.S. PATENT DOCUMENTS

| | | | | |
|---|---|---|---|---|
| 4,934,774 A | * | 6/1990 | Kalnitsky et al. | 385/130 |
| 5,035,916 A | * | 7/1991 | Kalnitsky et al. | 427/526 |
| 5,117,470 A | * | 5/1992 | Inoue et al. | 385/14 |
| 6,522,799 B1 | * | 2/2003 | Bazylenko et al. | 385/14 |
| 2002/0031319 A1 | * | 3/2002 | Wang | 385/125 |

* cited by examiner

Primary Examiner—Akm Enayet Ullah

(57) ABSTRACT

The present invention provides a method of forming a planar optical waveguide comprising the steps of forming a silica-based waveguide at a first temperature which is below a melting temperature of material from which the waveguide is formed; and annealing a region of the waveguide at a second temperature which is greater than the formation temperature and less than a melting temperature of material from which the waveguide is formed, so as to alter an effective refractive index of the region. In one embodiment the step of annealing is preceded by the step of forming a thin film heater over the region of the waveguide, the heater being capable of heating the region to the second temperature. The first temperature is preferably low (below 400° C.) to maximize the range of annealing temperatures.

31 Claims, 2 Drawing Sheets

PLANER WAVEGUIDE AND METHOD OF FORMATION

FIELD OF THE INVENTION

The present invention relates to a method of forming a planar optical waveguide, to a waveguide formed by such a method and to a method for tuning or "trimming" the waveguide.

BACKGROUND OF THE INVENTION

It is known to manufacture silica-based optical waveguides at a temperature above the melting point of the waveguide material by deposition techniques such as flame hydrolysis of a suitable precursor powder. It has been proposed, for example in U.S. Pat. No. 5,117,470 to Inoue et al., to thermally process a waveguide which is initially formed at a high temperature (about 1200° C.), so as to adjust the effective refractive index. The thermal processing involves heating the waveguide to a temperature which is below its formation temperature and melting point, followed by rapidly cooling the waveguide to room temperature. The process of post-deposition adjustment of the effective refractive index of a waveguide is sometimes referred to as "trimming".

One disadvantage of this prior art trimming process is that the initial formation temperature is quite high. Where the waveguide is integrated with other components such as active optical device structures or electronic elements, those structures typically cannot withstand temperatures in excess of 1000° C. A further disadvantage is that the process described in U.S. Pat. No. 5,117,470, which is dependent on a rapid cooling after the heating step, is only effective in regions of the waveguide which contain particular dopants, such as in the cladding layers of the waveguide.

It is thus an object of the present invention to provide a method of forming a waveguide that at least partially ameliorates a disadvantage of the prior art.

SUMMARY OF THE INVENTION

In a first aspect, the invention resides in a method of forming a planar waveguide comprising the steps of: forming a silica-based waveguide at a first temperature which is below a melting temperature of material from which the waveguide is formed; and annealing a region of the waveguide at a second temperature which is greater than the formation temperature and less than a melting temperature of material from which the waveguide is formed, so as to alter an effective refractive index of the region.

Preferably the step of annealing is preceded by the step of forming a thin film heater over the region of the waveguide, the heater being capable of heating the region to the second temperature.

Preferably the step of annealing is preceded by the step of analysing the formed waveguide to determine the refractive index profile of the waveguide.

In a second aspect, the invention resides in a method of forming a planar waveguide comprising the steps of: selecting a first temperature for forming a silica based waveguide which is below a melting temperature of material from which the waveguide is to be formed; forming said silica based waveguide at said first temperature from said material such that said waveguide is trimmable by a post formation annealing process on a region of said waveguide at a temperature between said first temperature and said melting temperature so as to alter the effective refractive index of the region.

Preferably the first temperature is selected so as to allow the refractive index of the region to be altered within an optimal range. It is thus preferred that the waveguide is formed at a temperature below 600° C., more preferably below 500° C. and still more preferably below 400° C.

Preferably the waveguide comprises a core formed between a buffer layer and a cladding layer, and at least one of the core, the buffer layer and the cladding layer is deposited by plasma-enhanced chemical vapour deposition (PECVD).

Preferably the method further comprises the step of annealing said region of the waveguide at said second temperature which is greater than the selected formation temperature and less than the melting temperature of material from which the waveguide is formed, so as to alter the effective refractive index of the region.

The invention further resides in a planar waveguide formed by any of the above-described methods. Furthermore, the invention resides in an optical device incorporating a waveguide formed according to the methods of the invention. An optical device may be, without limitation, any one of a group comprising an arrayed-waveguide grating (AWG), a Mach-Zehnder interferometer, a directional coupler, a polarization beam splitter, an N×M optical switch matrix, an optical modulator, an optical attenuator, a variable optical attenuator, an add/drop multiplexer and a variable add/drop multiplexer.

BRIEF DESCRIPTION OF THE DRAWINGS

The invention will now be described by way of non-limiting example only with reference to preferred embodiments and to the accompanying figures in which.

DETAILED DESCRIPTION OF PREFERRED EMBODIMENTS

The following embodiments describe a planar waveguide and a method for its fabrication, as well as optical devices incorporating the waveguide.

The present invention recognises the need to have a waveguide that can be tuned or "trimmed" by post-formation processes to adjust its effective refractive index and more particularly that the limits of the effective refractive index range in which the waveguide can be trimmed is optimised by the careful selection of the formation temperature of the waveguide.

Figure 1:
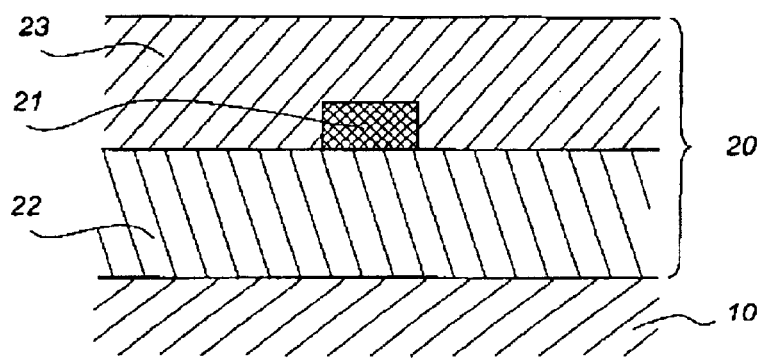
FIG. 1 shows a schematic cross section of a waveguide structure deposited at a temperature $T_1$.

In FIG. 1 there is shown a substrate 10 on which a silica-based waveguide 20 has been deposited using plasma-enhanced chemical vapour deposition (PECVD). The waveguide comprises a core 21, formed between a buffer layer 22 and a cladding layer 23, as is known in the art. It is preferred that the PECVD process, in particular the core layer deposition, is carried out using a liquid silicon-containing source material such as TEOS for the precursor vapour, and is conducted in the absence of nitrogen or nitrogen-containing source materials. During the PECVD process, the substrate 10 is maintained at a formation temperature $T_1$ which is below the melting temperature of the waveguide material. The effective refractive index of each layer of the waveguide is influenced by, amongst other deposition parameters, frequency of input power, level of input power, precursor flow rate, flux and energy of ion bombardment, overall pressure during the deposition, type and concentration of dopants in the various layers of the waveguide 20, and the temperature $T_1$. Further details of the PECVD process are contained in Australian provisional patent application number PR1782, entitled "Silica-based Optical Device Fabrication" and filed in the name of Redfern Integrated Optics Pty. Ltd., the contents of which are incorporated herein by reference. The temperature $T_1$ is minimised so as to allow a maximum range of refractive index adjustment in the formed waveguide structure 20 through subsequent annealing at a temperature below the melting temperature of the waveguide 20. It is preferred that $T_1$ is approx. 350° C. to allow the resultant waveguide structure to be trimmed by a post-formation treatment with a maximum range of refractive indices available. Annealing the waveguide at temperatures above the deposition temperature will lower the refractive index of the materials in the waveguide, and thereby lower the effective refractive index of the waveguide.

Figure 2:
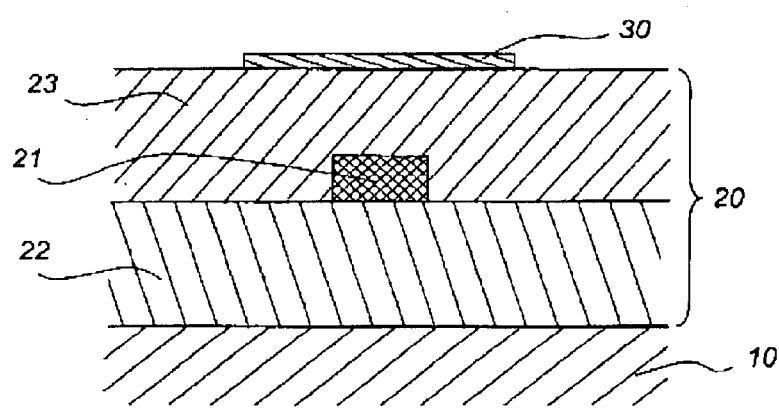
FIG. 2 shows a schematic cross section of the waveguide structure of FIG. 1 on which has been deposited a thin film heater.

To enable trimming of the waveguide structure 20, a thin film heater 30 is deposited on the top of waveguide structure 20 as illustrated in FIG. 2. The thin film heater is capable of producing a power density sufficient to heat the waveguide structure 20 above the formation temperature $T_1$ and preferably up to just below the melting temperature of the waveguide structure. The heater component is connected to contact pads (not shown) for connection to a power supply.

The device illustrated in FIG. 2 is a generic waveguide structure with an effective refractive index (as deposited) that has been selected to allow maximum trimming depending on the purpose for which the waveguide will ultimately be employed by an end user.

To trim the effective refractive index to requirements, the existing effective refractive index can first be confirmed using known optical diagnostic techniques. Current is then applied to the heating element 30 to heat a region beneath the element 30 to a temperature above the formation temperature but below the melting temperature of the waveguide. Heating continues until a temperature required to attain the desired effective refractive index is reached.

Figure 3:
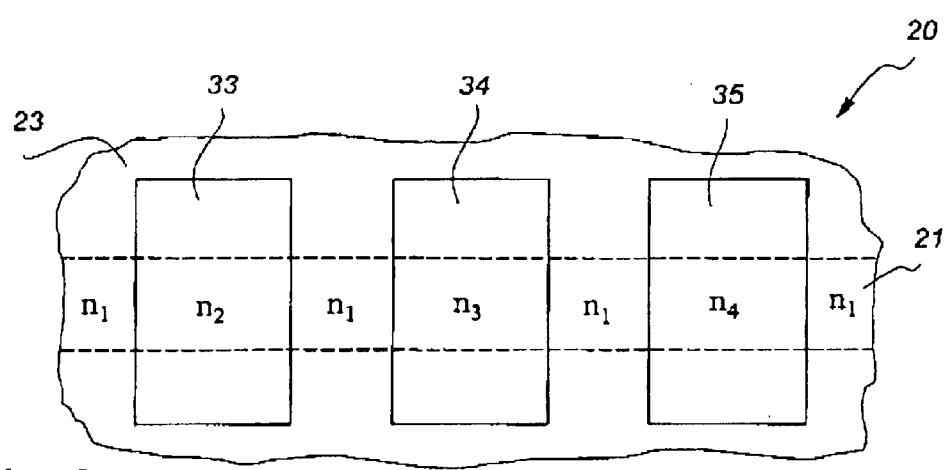
FIG. 3 shows a schematic plan view of a waveguide structure with a series of heating elements.

As is apparent from the waveguide plan view of FIG. 3, a series of heating elements 33, 34, 35 may be formed over the waveguide 20 along its length. This arrangement of heaters allows a non-uniform heating profile to be provided, either to account for inhomogenities in the waveguide to produce a uniform refractive index, or to produce a non-uniform refractive index profile $n_2$, $n_3$ and $n_4$ where the waveguide is covered by heating elements 33, 34, 35, respectively. Non-uniform heating may be achieved by supplying a different heating current to each of the heating elements 33, 34, 35 or by having elements of different dimensions and/or materials.

When silica is heated, the change in refractive index typically has a reversible component and an irreversible component. It is therefore necessary when trimming the waveguide to allow the waveguide to cool to room temperature before measuring the irreversible component of the refractive index. It is also important not to heat the waveguide to a temperature that results in an irreversible refractive index beyond that required. A typical trimming process will thus include the sequence of heating the waveguide, allowing the waveguide to cool and measuring the irreversible component of the effective refractive index. This process can be repeated with progressively greater heating currents (or progressively more pulses of current) until the waveguide has the desired effective refractive index.

Of course, if the thermal properties of the waveguide and heating properties of the thin film heater are known, the waveguide can be trimmed using a predetermined heating time and temperature which are known to produce the required irreversible refractive index profile.

When a core is to be trimmed close to other waveguides, the core can be thermally isolated by forming air-filled grooves either side of the core. The grooves can be formed in the cladding layer and buffer layer, for example by etching.

Figure 4:
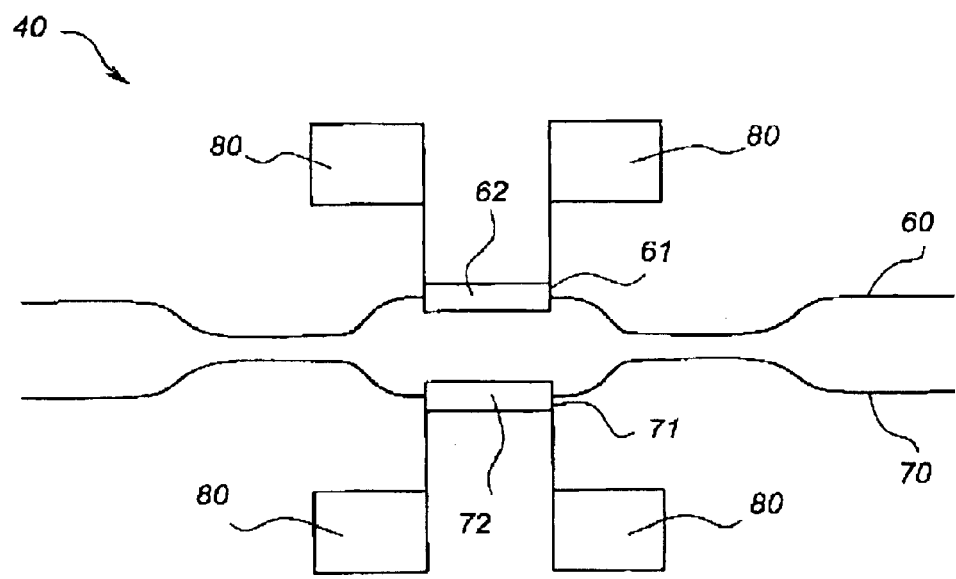
FIG. 4 shows an embodiment of the invention in a Mach-Zehnder interferometer.

An application of the present invention is in a Mach-Zehnder interferometer described herein with reference to FIG. 4. The interferometer 40 includes a pair of waveguides 60, 70 each having a region 61, 71 respectively on which is formed respective heating elements 62, 72 connected to contact pads 80 for supplying a heating current to the elements 62, 72. The interferometer can be manufactured using known PECVD processes modified in accordance with the present invention. The arms 61, 71 can be annealed post formation at a temperature above the formation temperature but below the melting point to permanently set the effective refractive index in the arms to that required for the interferometer.

The interferometer can then be operated in a switching mode by utilising the thermo-optic effect in the arms 61, 71 to reversibly adjust the refractive index in one arm relative to the other, thereby introducing a phase shift between the two waveguides 61, 71. The effective refractive index can be adjusted during operation of the interferometer by employing the heating elements 62, 72 at much lower temperatures than during the annealing process, typically at temperatures of approximately 100° C. Because the switching temperatures are below the formation temperature of the waveguides, the refractive index change is reversible during the switching mode.

Figure 5:
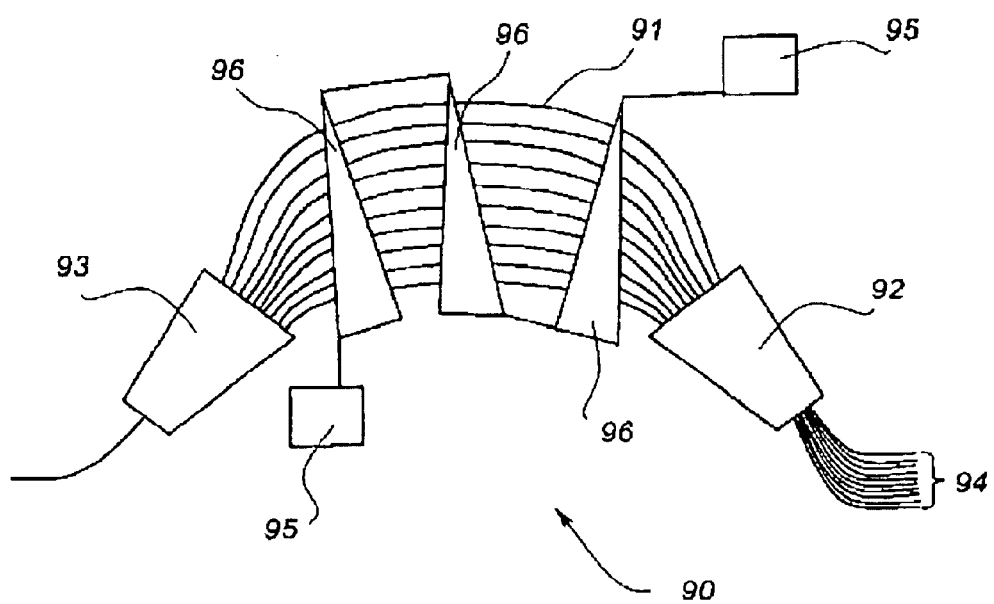
FIG. 5 shows an embodiment of the invention in an arrayed waveguide grating.

A further application of the present invention is in an arrayed-waveguide grating (AWG) described schematically with reference to FIG. 5. An AWG 90 comprises an array 91 of waveguides disposed between a first star coupler 92 and a second star coupler 93. Ideally, the optical path length of the waveguides 91 increases monotonically by a constant value across the waveguide array. If the path lengths of the waveguides 91 do not increase by a constant value across the array, there will be cross-talk between output channels 94 when the AWG is operated as a demultiplexer. An AWG can be manufactured according to the present invention by first depositing a series of adjacent waveguides on a single substrate at a formation temperature below the melting point of the waveguide material. Post-formation optical analysis of the AWG can confirm the effective refractive index profile of the array 91 and detect any inhomogenities in the array that could potentially lead to signal cross-talk. It sometimes happens that non-uniformities in the deposition process produce a systematic variation in effective refractive index across the array of waveguides 91. In this case, a tapered heater can be deposited across the width of the array such that the narrowest regions of the heater cover the waveguides which need to be trimmed to the greatest extent, and vice versa. FIG. 5 illustrates an example of such a heater in which a series of tapered heating elements 96 are deposited along the length of the waveguide array 91, each element covering the width of the array 91. The heating elements 96 are tapered to provide greater heating in the narrower sections. A heating current is then applied through contact pads 95 to the heating elements 96 to remove the inhomogenities by altering the effective refractive index profile of the waveguide array 91. An alternative technique (not shown) of using heating elements to trim the waveguides 91 is to deposit separate heating elements over one or more selected waveguides within the array 91 and to anneal those waveguides separately without affecting the remaining waveguides in the array.

As will be apparent to the skilled addressee, the present invention allows waveguide structures to be produced in a more flexible and thus more cost effective manner by providing a post-formation process allowing the structures to be trimmed to requirements. An important advantage of the invention is that the methods can be used for the production of generic components that can be trimmed within broad parameters to suit specific requirements with little consideration of the specific use to which those components will ultimately be put.

It will be appreciated by the person skilled in the art that numerous modifications and/or variations can be made to the present invention as described herein without departing from the spirit or scope of the invention as broadly described and it is thus intended that any or all such modifications and/or variations are embraced herein.

I claim:

1. A method of forming a planar optical waveguide comprising the steps of:
    forming a silica-based waveguide at a first temperature which is below a melting temperature of material from which the waveguide is formed; and
    annealing a region of the waveguide at a second temperature which is greater than the formation temperature and less than a melting temperature of material from which the waveguide is formed, so as to alter an effective refractive index of the region.

2. A method according to claim 1 wherein the step of annealing is preceded by the step of forming a thin film heater over the region of the waveguide, the heater being capable of heating the region to the second temperature.

3. A method according to claim 1 wherein the step of annealing is preceded by the step of analysing the formed waveguide to determine the effective refractive index of the waveguide.

4. A method according to claim 1 wherein the waveguide comprises a core formed between a buffer layer and a cladding layer, and at least one of the core, the buffer layer and the cladding layer is deposited by plasma-enhanced chemical vapour deposition (PECVD).

5. A method according to claim 1 wherein at least a core of the waveguide is formed at a temperature below 600° C.

6. A method according to claim 1 wherein at least a core of the waveguide is formed at a temperature below 500° C.

7. A method according to claim 1 wherein at least a core of the waveguide is formed at a temperature below 400° C.

8. A method according to claim 1 wherein the waveguide is formed using a plasma-enhanced chemical vapour deposition (PECVD) process.

9. A method according to claim 1 wherein the waveguide is formed using a plasma-enhanced chemical vapour deposition (PECVD) process, the PECVD process being conducted in the absence of nitrogen and nitorgen-containing source materials.

10. A method according to claim 1 wherein the waveguide is formed using a plasma-enhanced chemical vapour deposition (PECVD) process, the PECVD process being conducted using a liquid silicon-containing source material.

11. A method according to claim 10 wherein the liquid silicon-containing source material comprises tetraethoxysilane (TEOS).

12. A method of forming a planar optical waveguide including the steps of:
    selecting a first temperature for forming a silica based waveguide which is below a melting temperature of material from which the waveguide is to be formed; and
    forming said silica based waveguide at said first temperature from said material such that said waveguide is trimmable by a post formation annealing process on a region of said waveguide at a temperature between said first temperature and said melting temperature so as to alter the effective refractive index of the region.

13. A method according to claim 12 further including the step of forming a thin film heater over said region of the waveguide, said heater being capable of heating the region to a temperature greater than the first temperature.

14. A method according to claim 12 wherein the waveguide comprises a core formed between a buffer layer and a cladding layer, and at least one of the core, the buffer layer and the cladding layer is deposited by plasma-enhanced chemical vapour deposition (PECVD).

15. A method according to claim 12 further including the step of annealing the region of the waveguide at a second temperature which is greater than the selected formation temperature and less than the melting temperature of material from which the waveguide is formed, so as to alter the effective refractive index of the region.

16. A method according to claim 12 wherein said first temperature is selected so as to allow the refractive index of the region to be altered within an optimal range.

17. A method according to claim 12 wherein at least a core of the waveguide is formed at a temperature below 600° C.

18. A method according to claim 12 wherein at least a core of the waveguide is formed at a temperature below 500° C.

19. A method according to claim 12 wherein at least a core of the waveguide is formed at a temperature below 400° C.

20. A method according to claim 12 wherein the waveguide is formed using a plasma-enhanced chemical vapour deposition (PECVD) process.

21. A method according to claim 12 wherein the waveguide is formed using a plasma-enhanced chemical vapour deposition (PECVD) process, the PECVD process being conducted in the absence of nitrogen and nitrogen-containing source materials.

22. A method according to claim 12 wherein the waveguide is formed using a plasma-enhanced chemical vapour deposition (PECVD) process, the PECVD) process being conducted using a liquid silicon-containing source material.

23. A method according to claim 22 wherein the liquid silicon-containing source material comprises tetraethoxysilane (TEOS).

24. An optical waveguide structure comprising a silica-based planar optical waveguide formed at a first temperature below a melting point of the material of the waveguide and at least one heating element disposed on said planar optical waveguide capable of heating a region of said waveguide beneath said element to a temperature which is greater then said temperature and less than said melting point.

25. An optical waveguide structure according to claim 24 wherein said heating element is a thin film heater.

26. An optical waveguide structure according to claim 24 wherein an effective refractive index of said region beneath said heating element differs from an effective refractive index in a region of said waveguide away from said heating element.

27. An optical waveguide structure according to claim 24 wherein at least a core of the waveguide is formed at a temperature below 600° C.

28. An optical waveguide structure according to claim 24 wherein at least a core of the waveguide is formed at a temperature below 500° C.

29. An optical waveguide structure according to claim 24 wherein at least a core of the waveguide is formed at a temperature below 400° C.

30. An optical component incorporating a waveguide according to claim 24.

31. An optical component according to claim 30 wherein the component is one of the group comprising an arrayed-waveguide grating (AWG), a Mach-Zehnder interferometer, a directional coupler, a polarization beam splitter, an N×M optical switch matrix, an optical modulator, an optical attenuator, a variable optical attenuator, an add/drop multiplexer and a variable add/drop multiplexer.

* * * * *